(12) United States Patent
Gros et al.

(10) Patent No.: US 9,150,279 B2
(45) Date of Patent: Oct. 6, 2015

(54) METHOD FOR MEASURING POWER IN A BICYCLE

(75) Inventors: Jean-Philippe Gros, Le Fontanil Cornillon (FR); Dominique David, Claix (FR); Gorka Arrizabalaga, Lans en Vercors (FR); Cédric Morio, La Madeleine (FR); Philippe Androuet, Lille (FR); Sébastien Brulais, Grenoble (FR)

(73) Assignee: Commissariat à l'énergie atomique et aux énergies alternatives (FR)

( * ) Notice: Subject to any disclaimer, the term of this patent is extended or adjusted under 35 U.S.C. 154(b) by 90 days.

(21) Appl. No.: 13/825,614

(22) PCT Filed: Sep. 23, 2011

(86) PCT No.: PCT/FR2011/052216
§ 371 (c)(1),
(2), (4) Date: Oct. 21, 2013

(87) PCT Pub. No.: WO2012/038677
PCT Pub. Date: Mar. 29, 2012

(65) Prior Publication Data
US 2014/0297070 A1    Oct. 2, 2014

(30) Foreign Application Priority Data
Sep. 23, 2010 (FR) .................................... 10 57646

(51) Int. Cl.
B62M 1/36    (2013.01)
B62M 6/50    (2010.01)
G01L 3/24    (2006.01)
B62M 3/08    (2006.01)

(52) U.S. Cl.
CPC . B62M 6/50 (2013.01); B62M 3/08 (2013.01); G01L 3/24 (2013.01); B62K 2207/00 (2013.01)

(58) Field of Classification Search
CPC ............. B62M 6/50; B62M 3/08; G01L 3/24; B62K 2207/00
See application file for complete search history.

(56) References Cited

U.S. PATENT DOCUMENTS 5,992,553 A * 11/1999 Morrison .................... 180/206.2
7,599,806 B2 * 10/2009 Hauschildt ...................... 702/44
(Continued)

FOREIGN PATENT DOCUMENTS

EP    2028098 A2    8/2007
SI    22645 A    4/2009

OTHER PUBLICATIONS

Giesen, Fabian, "International Patent Application PCT/FR2011/052216 International Search Report", Dec. 1, 2012, Publisher: EPO, Published in: EP.

(Continued)

Primary Examiner — John Q Nguyen
Assistant Examiner — Alan D Hutchinson
(74) Attorney, Agent, or Firm — Kaplan Breyer Schwarz & Ottesen, LLP

(57) ABSTRACT

A method and system for measuring the output power produced in a device having a crankset, includes: measuring the orthogonal force exerted on at least one pedal of the crank; determining the angular velocity of the crank; and deducing the tangential force exerted on the crank and the power, using a pre-established model of the distribution of the force exerted on the actuating member as a function of the angular velocity.

15 Claims, 9 Drawing Sheets

(56) References Cited

U.S. PATENT DOCUMENTS 8,122,773 B2 * 2/2012 Wyatt et al. .................... 73/818
2007/0245835 A1 10/2007 Hauschildt

OTHER PUBLICATIONS

Fabian Giesen, "International Patent Application PCT/FR2011/052216 Written Opinion of the International Searching Authority", Dec. 1, 2012, Publisher: EPO, Published in: EP.

* cited by examiner

METHOD FOR MEASURING POWER IN A BICYCLE

FIELD OF THE INVENTION

The present invention relates to a system for measuring the output power developed in a crank system. It more specifically aims at a system for measuring the output power developed in a pedal vehicle, for example, a bicycle.

DISCUSSION OF THE RELATED ART

Several solutions have been provided to measure the output power developed by a cyclist on a bicycle. Output power designates the amount of energy provided per time unit, effectively taking part in setting the bicycle to motion.

It is indeed known that part of the forces exerted by the cyclist does not take part in setting the bicycle to motion. At a given time, the proportion of the provided energy which really takes part in setting the bicycle to motion depends not only on the angular position of the crankset, but also on various factors such as the slope, the cyclist's position, the pedaling rate, etc.

Knowing, at any time, the developed output power may help racing cyclists optimize their performance. It especially enables them to better manage their effort and their pedaling motion, during training or in a race.

Systems integrating a network of several strain gauges arranged in the pedals and/or in the crankset to determine, at any time, the distribution, in a three-dimensional reference frame, of the force exerted by the cyclist on the pedals, have been provided. The motive portion of the exerted force can thus be isolated. The drive torque exerted on the crankset can be deduced therefrom. Additional sensors are further provided to determine at any time the angular position of the crankset and/or of the pedal, as well as the angular velocity of the crankset. The developed output power can be deduced therefrom. Examples of this type of device are described in patent applications WO2009083787 and WO8900401.

A disadvantage of such devices is the complexity of the strain gauge network necessary to isolate the motive portion of the force exerted on the pedals. As an example, in patent application WO2009083787, four identical strain gauges should be integrated according to a very specific arrangement in each pedal, and interconnected. As a result, such devices are particularly complex, expensive, and delicate to install. In practice, the installation of this type of devices requires the intervention of dedicated staff. Their use is generally limited to the field of very high-level professional cycling.

Other solutions for measuring the output power developed by a cyclist on a bicycle are described in documents DE102005027181, US20070245835, and EP2028098.

It would be desirable to have power measurement systems accessible to a wider public than current systems.

It would further be desirable to be able to optimize the use of a motor-driven pedal-assist system.

SUMMARY

Thus, an object of an embodiment of the present invention is to provide a system for measuring the output power developed in a pedal vehicle, which overcomes all or part of the disadvantages of existing solutions.

Another object of an embodiment of the present invention is to provide such a system which is less complex and less expensive than existing systems.

An object of an embodiment of the present invention is to provide such a system which is easy to install, and which especially does not require being installed by dedicated staff.

Thus, an embodiment of the present invention provides a system for measuring the output power developed in a crankset device, comprising: on at least one pedal for actuating a crank of the crankset, a single pressure sensor capable of measuring the orthogonal force exerted by the user on the pedal; at least one sensor for determining the angular position of the crank around a rotation axis of the crankset different from a rotation axis of the pedal with respect to the crank; and a calculator for determining, by means of a pre-established model of distribution of the force exerted on the pedal according to said angular position, the tangential force exerted on the crank.

According to an embodiment of the present invention, this measurement system comprises an element of fastening to the pedal, having the pressure sensor affixed thereto, and an interface plate capable of transmitting a force exerted by the cyclist to said pressure sensor.

According to an embodiment of the present invention, the fastener is assembled on the pedal by lateral guide rails provided on the pedal.

According to an embodiment of the present invention, the fastener is screwed to a framework of the pedal.

According to an embodiment of the present invention, the fastener is snapped on a body portion or on an axis of the pedal.

According to an embodiment of the present invention, the pressure sensor faces an axis of pedal fastening to the crank.

According to an embodiment of the present invention, the pressure sensor comprises a strain gauge or a piezoelectric element.

According to an embodiment of the present invention, the measurement system further comprises means for determining the angular velocity of the crank.

According to an embodiment of the present invention, the measurement system further comprises means for determining the acceleration of the crank.

According to an embodiment of the present invention, the angular position sensor comprises an accelerometer, a gyroscope, or a magnetic angle sensor.

According to an embodiment of the present invention, the sensors are capable of communicating with the calculator via a wireless link.

A bicycle equipped with a power measurement system is also provided.

A system for controlling a pedal-assist motor in a pedal vehicle is also provided, comprising: a system for measuring the output power developed in a crank device; and means for increasing the motor power when the power provided by the user decreases and for decreasing it when the power provided by the user increases.

A bicycle equipped with a pedal-assist motor and with a system for controlling this motor is also provided.

A method for using a power measurement system is also provided, comprising the steps of: a) measuring the orthogonal force exerted by the user on the pedal; b) determining the angular position of the crank around the rotation axis of the crankset; and c) by means of a pre-established model of distribution of the force exerted on the pedal according to said angular position, deducing the tangential force exerted on the crank.

According to an embodiment of the present invention, this method further comprises, before step c), the steps of: d)

determining the angular velocity of the crank around the crankset axis; and e) selecting said model from a list of pre-established models.

According to an embodiment, the method further comprises the step of: deducing from said tangential force the developed output power.

BRIEF DESCRIPTION OF THE DRAWINGS

The foregoing and other objects, features, and advantages will be discussed in detail in the following non-limiting description of specific embodiments in connection with the accompanying drawings, among which.

DETAILED DESCRIPTION

Figure 1:
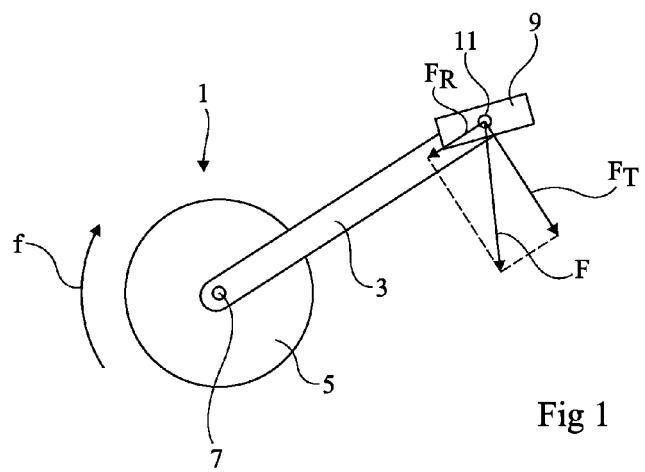
FIG. 1 is a side view schematically showing an embodiment of a bicycle crankset.

For clarity, the same elements have been designated with the same reference numerals in the different drawings and, further, the various drawings are not to scale.

FIG. 1 is a side view schematically showing an embodiment of a bicycle crankset 1. Crankset 1 comprises a crank 3 having a first end affixed to a drive plate 5 of generally circular shape. Crank 3, for example formed of a rigid bar or tube, is affixed to plate 5 along a radial direction. Plate 5 can be rotated around an axis 7 orthogonal to the plate and running through the center of the plate. Axis 7 forms the rotation axis of the crankset. At its periphery, plate 5 generally comprises teeth, not shown, capable of driving a transmission chain. On its second end side, crank 3 is capable of receiving a pedal 9 which can be rotated around an axis 11 parallel to axis 7. A second crank (not shown) is generally provided on axis 7, on the other side of the frame in the case of a bicycle, forming an angle of approximately 180° with crank 3. This second crank supports a pedal (not shown) which can be rotated around an axis parallel to axis 11.

When the cyclist presses on the pedals, the force is transmitted to plate 5 by cranks 3, causing a rotating motion of the crankset around axis 7 (in the direction indicated by arrow f).

Figure 2:
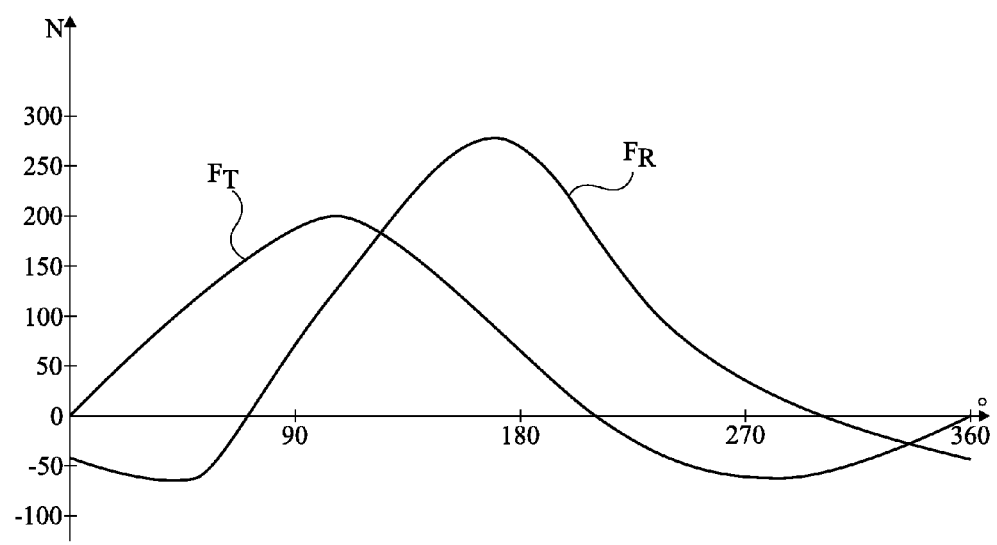
FIG. 2 is a diagram schematically showing the variation, during a pedaling cycle, of the forces exerted by a cyclist on a crankset crank via a pedal.

FIG. 2 is a diagram schematically showing the variation, in a normal pedaling cycle, of the forces exerted by a cyclist on a crank 3 (FIG. 1) via pedal 9. The angle, in degrees (°), formed between the crank and the vertical direction, has been shown in abscissas, and the value of the forces in Newtons (N) has been shown in ordinates. This diagram corresponds to a complete pedaling cycle, from 0 to 360°, performed on a bicycle in normal operating position, on a road with no significant slope. A 0° (or 360°) angle in abscissa corresponds to the highest position of the pedal, while a 180° angle corresponds to lowest position of the pedal.

When the cyclist presses on the pedals, force F (FIG. 1) transmitted to each crank actually is the sum of a tangential force $F_T$, orthogonal to the crank and parallel to the plane of the drive plate, and of a radial force $F_R$, parallel to the crank. Tangential component $F_T$ is a drive force causing the rotation of the crankset around its axis. Conversely, radial component $F_R$ takes no part in setting the bicycle to motion.

As illustrated in FIG. 2, tangential and radial components $F_T$ and $F_R$ vary according to the angle formed between the crank and the crankset. In this example, component $F_T$ is maximum (close to 200 N) around 100°, and minimum (close to −60 N) around 300°. Component $F_R$ is maximum (close to 270 N) around 170°, and minimum (close to −70 N) around 50°. Component $F_T$ briefly disappears at 200° and at 360°, and component $F_R$ briefly disappears approximately at 70° and at 320°.

Different factors are capable of modifying the break-down mode of total force F exerted on the pedal into $F_T$ and $F_R$. These essentially are the slope, the cyclist's upright (standing up on the pedals) or seated position, and the pedaling rate. It should further be noted that, the higher the pedaling rate, the lower the proportion of total force F formed by motive component $F_T$. Further, the slope tends to offset the points of inflexion of the curves of FIG. 2. In particular, uphill, the points of inflexion are offset to the left. It should further be noted that when the cyclist is standing up on the pedals, the peak force is offset to the right with respect to the diagram of FIG. 2.

However, it can be observed that in given conditions of slope, pedaling rate, and cyclist position, the breaking up of force F into components $F_T$ and $F_R$ according to the angular position of the crankset varies little from one cyclist to the other.

A set of universal models of distribution of the pedaling force, corresponding to various combinations of conditions currently encountered by cyclists (uphill, flat, downhill, seated position, fast rate, slow rate, etc.) may accordingly be constructed. Models of this type have been published, in the 2000s, by the Laboratoire des sciences du sport of the Besancon University, in report "*Comparaisons de patterns de pédalage en cyclisme dans les conditions de laboratoire et de terrain*" of "William Bertucci".

Based on models of this type, it is here provided to extract look-up tables defining the variation of the percentage of force F formed by motive component $F_T$, according to the angular position of the crank, possibly by deducing it from radial component $F_R$.

Figure 3:
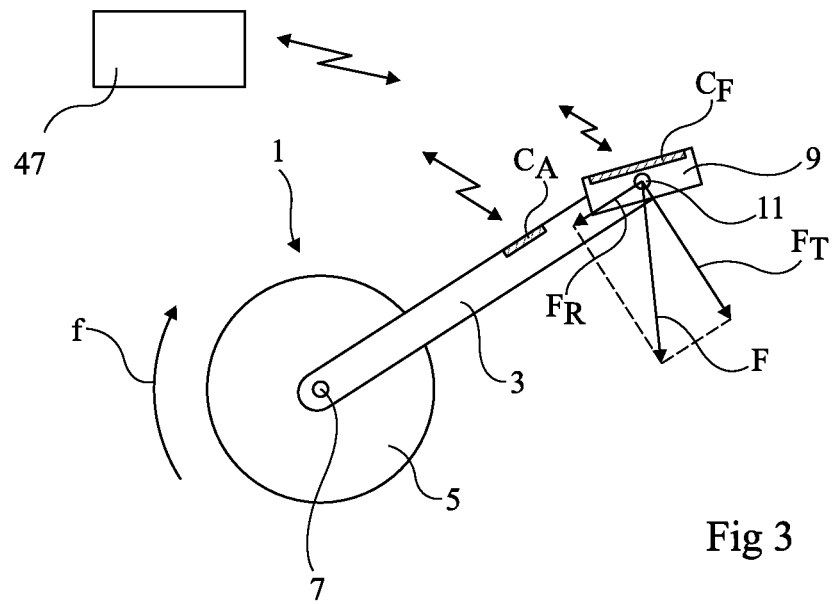
FIG. 3 is a side view of a crankset, schematically and partially illustrating an embodiment of a power measurement system.

FIG. 3 is a side view of a crankset 1 of the type described in relation with FIG. 1, schematically and partially illustrating a system for measuring the output power developed by the cyclist.

According to an aspect of an embodiment of the present invention, a power measurement system is provided, comprising:

on a pedal 9, a single pressure sensor $C_F$ capable of measuring total force F exerted by the cyclist;

on the pedal or on the crankset (on crank 3 in the shown example), at least one sensor $C_A$ of the angular position of the crank around axis 7 of the crankset; and a calculator 47 for determining, based on the measured angular position and on a pre-established look-up model, the percentage of force F formed by motive component $F_T$.

Knowing the value of component $F_T$, it is possible to calculate the output power $P_u$ developed by the cyclist and defined as follows: $P_u = F_T \times L_m \times V_a$, where $L_m$ is the crank length and $V_a$ is the angular velocity of the crankset. The angular velocity of the crankset is for example provided by sensor $C_A$.

Total force F exerted by the cyclist here means the force resulting from the sum of all the forces exerted by the cyclist on the pedal and transmitted to crank 3. The inventors have observed that, in practice, in a pedaling cycle, this force is always substantially orthogonal to the pedal, that is, orthogonal to the contact plane between the sole of the cyclist's shoe and the pedal. This is particularly true in the motive phase of the pedaling cycle, that is, when the angular position of the crank around the crankset axis ranges between 0 and 180° (vertical positions of the crank). In the present description, total force F is thus equate with its component orthogonal to the pedal. In the provided measurement system, sensor $C_F$ is a simple pressure sensor arranged inside of or on pedal 9 and capable of measuring the force exerted by the cyclist orthogonally to the pedal. An advantage thus is that it is not necessary to provide a plurality of sensors measuring the different components of force F.

An advantage of such a measurement system is that it only requires, to determine motive component $F_T$ of the force exerted by the cyclist on a pedal, a single pressure sensor $C_F$ on this pedal. Sensor $C_F$ may be very simple. It for example is a pressure sensor of the type used in bathroom scales. Motive component $F_T$ is then determined by software means by calculator 47, according to the angular position of the crankset. The equipment is thus considerably simplified as compared with existing solutions.

In a particularly simplified embodiment, a single look-up model between the angular position of the crank and the percentage of force F formed by motive component $F_T$, independently from the cycling conditions may be used.

However, for a better measurement accuracy, a set of several models corresponding to various combinations of conditions currently encountered by cyclists is preferably used.

The predominating factor for the distribution of force F into tangential and radial components $F_T$ and $F_R$ is the pedaling rate. Thus, in a preferred embodiment, the look-up model is selected from a set of several models, according to the pedaling rate.

In a preferred embodiment, angular position sensor $C_A$ is an accelerometer placed on the crankset or in the pedal. A communication link, for example, a wireless link, is provided between sensor $C_A$ and calculator 47. The measurements of the crankset acceleration provide an easily exploitable signal of the radial acceleration and to thus enable to identify characteristic points of the pedal phase (for example, to identify when in it is in its high position), and to correct the measurements, that is, take into account the power sensor data of the power sensors between two adjacent intervals in a cycle to apply a given algorithm thereto, according to the position of these data in the cycle, to convert them into an effective power. Such measurements enable to calculate the angular velocity of the crankset around axis 7 (for example, via calculator 47), that is, the pedaling rate. It should be noted that the crankset acceleration measurements also enable to determine the slope and the cyclist's position. Thus, in an alternative embodiment, the slope and position factors may be taken into account to select the force distribution model. To determine the slope and position conditions, the acceleration measurement is preferably performed over at least one full pedaling cycle. The acceleration curve of the crankset forms a signature which may be compared with pre-established records, stored in the calculator. More generally, any other method capable of determining the cycling conditions may be used. A modulation coefficient may then be applied to the model selected according to the pedaling rate.

In another embodiment, sensor $C_A$ comprises a thumb wheel, enabling to determine at any time the angular position of the crank around axis 7. The angular velocity, and thus the pedaling rate, can then be calculated by calculator 47. An advantage of this embodiment is its low cost.

In another embodiment, sensor $C_A$ comprises a rate gyroscope capable of directly providing a measurement of the angular velocity of the crank around axis 7.

In another embodiment, sensor $C_A$ comprises a magnetic angle sensor.

In the example shown in FIG. 3, pressure sensor $C_F$ is arranged on the side of pedal 9 that the cyclist's foot is capable of pressing. Sensor $C_F$ is capable of communicating with calculator 47, for example, via a wireless link. Sensor $C_F$ may be powered by a battery housed in the pedal, by a power recovery system associated with the crankset, or by any other means. According to an alternative embodiment, sensor $C_F$ may be a self-contained sensor with a piezoelectric element.

Calculator 47 for example comprises a microcontroller for executing software instructions, and a memory for storing models of distribution of the pedaling force.

Figure 4:
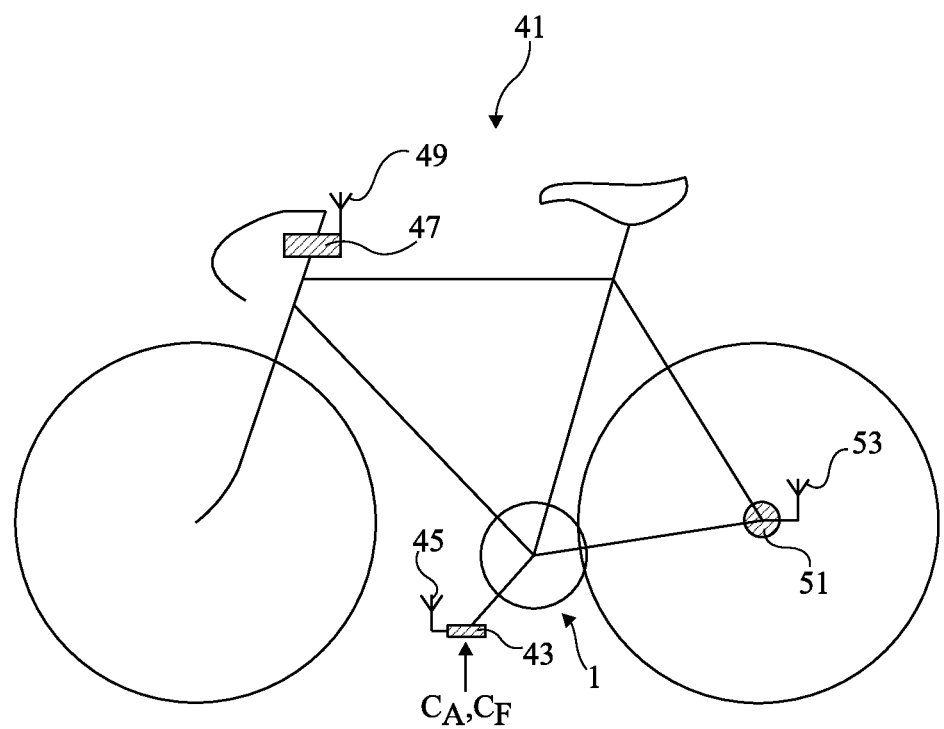
FIG. 4 schematically shows a bicycle equipped with a power management system of the type described in relation with FIG. 3.

FIG. 4 schematically shows a bicycle 41 equipped with a power measurement system of the type described in relation with FIG. 3. In this example, sensors $C_A$ and $C_F$ are integrated in a same package 43 affixed to the pedal and comprising a wireless communication antenna 45. Calculator 47 is placed in a package provided with a wireless communication antenna 49. In the shown example, calculator 47 is placed at the bicycle handlebar level. It is for example integrated to a tachometer display panel.

Bicycle 41 further comprises, on its back wheel side, a pedal-assist motor 51, for example, an electric motor. In this example, the power measurement system is used to optimize the use of assist motor 51. An antenna 53 provided on the side of motor 51 enables to establish a communication between the motor and the calculator. It is here provided to use the measurement of the power provided by the cyclist to control variations of the speed of motor 51, increasing when the power provided by the cyclist decreases, and decreasing when the power provided by the cyclist increases.

Figure 5A:
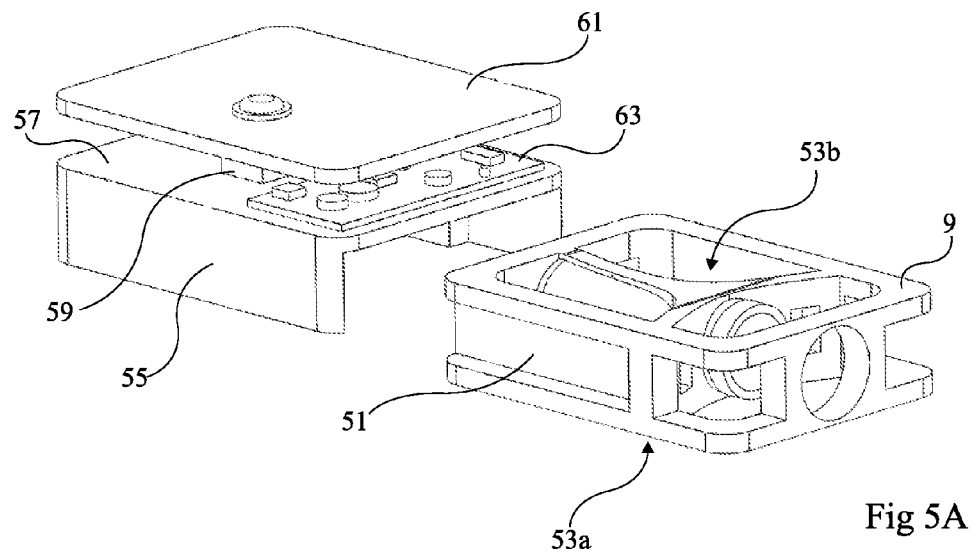
FIGS. 5A and 5B are perspective views showing in more detailed fashion an embodiment of a power measurement system capable of being assembled on a bicycle pedal.
Figure 5B:
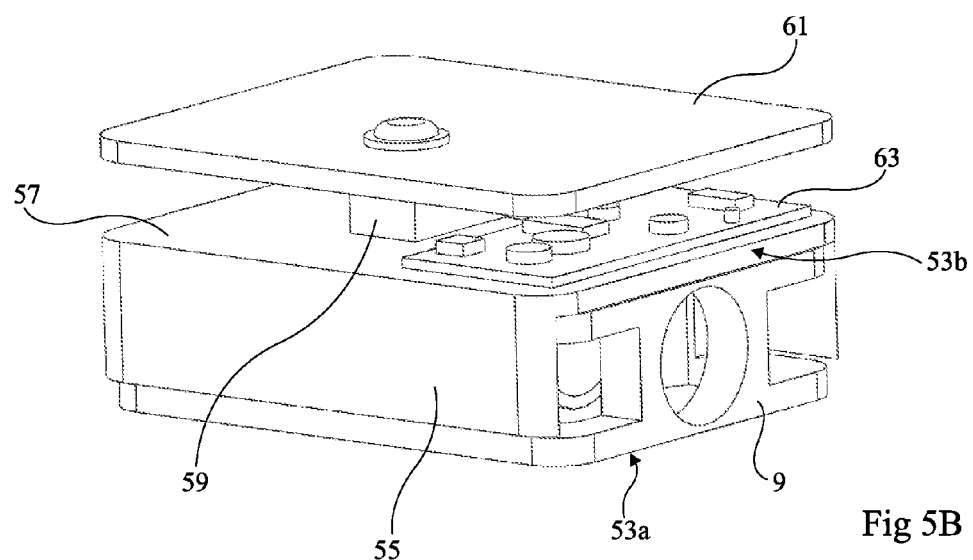

FIGS. 5A and 5B are perspective views showing in more detailed fashion an embodiment of a power measurement system capable of being assembled on a bicycle pedal 9. FIG. 5A is an exploded view (before assembly of the measurement system) of the system of FIG. 5B (measurement system assembled on the pedal).

Pedal 9 has a substantially parallelepipedal general external shape comprising two main parallel opposite surfaces 53a and 53b and four lateral surfaces of smaller surface areas (bearing no reference numerals in the drawing). In this example, pedal 9 comprises, on at least one lateral surface, a guide rail 51, for example, a guide rail of the type usually provided to receive reflective strips (reflectors).

The provided power measurement system comprises an element 55 of fastening to the pedal. Fastener 55 here is a package (or a portion of a package) capable of covering one of the main surfaces of the pedal (surface 53*b* in the present example) and two parallel lateral surfaces, one at least comprising a guide rail 51. Fastener 55 fits into guide rail(s) 51. It should be noted that lateral guide rails are often provided on the bicycle pedals. The provided system takes advantage of these guide rails and can thus be easily assembled on all pedals of this type.

On surface 57 of package 55 opposite to surface 53*b* of the pedal, on the side opposite to the pedal, is affixed a pressure sensor 59, for example, by means of a screw or of glue. Sensor 59 for example is a piezoelectric sensor or a strain gauge comprising a proof body capable of transmitting deformations to an electric circuit to modify its resistivity. An interface plate 61 parallel to surface 57 of the package is affixed to pressure sensor 59, on the side opposite to surface 57. Interface plate 61 is a rigid plate, for example, made of metal or of plastic, intended, in operation, to be in contact with the cyclist's foot (or shoe). When the cyclist presses on the pedal, plate 61 transmits the exerted force and sensor 59 deforms, thus providing a measurement representative of the component orthogonal to surface 53*b* (or to plate 61) of the force exerted by the cyclist.

The measurement system further comprises an electronic circuit 63 arranged between fastener 55 and protection plate 61. Circuit 63 is capable of processing the signals provided by sensor 59 and of communicating with an external system. Circuit 63 may further comprise an accelerometer and/or a gyroscope to measure the angular velocity of the crank around the crankset axis.

Figure 6A:
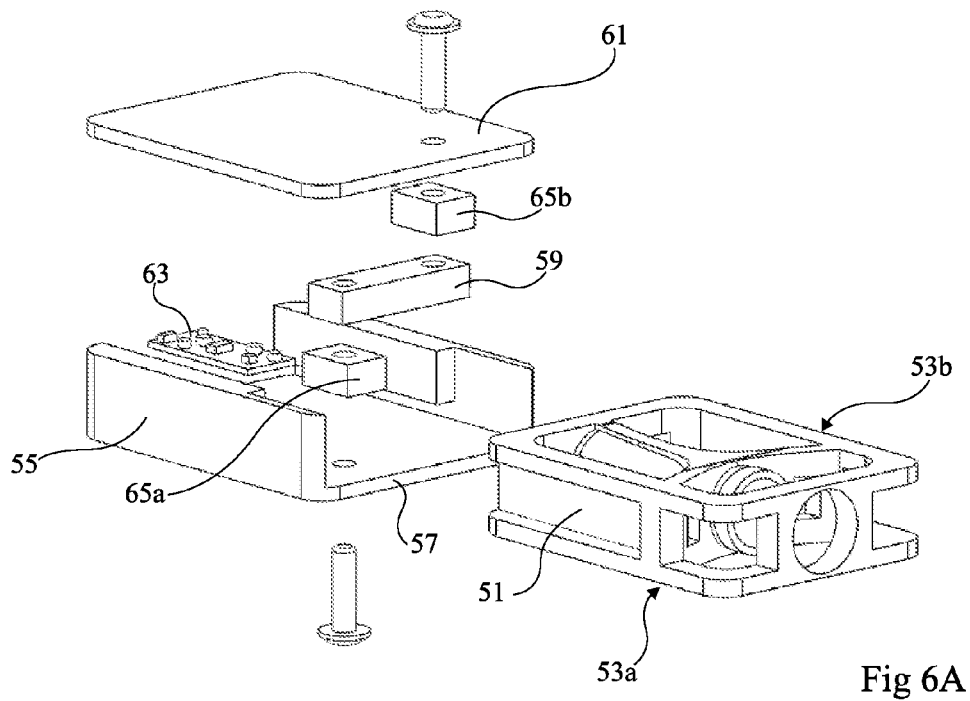
FIGS. 6A and 6B are perspective views showing an alternative embodiment of the measurement system of FIGS. 5A and 5B.
Figure 6B:
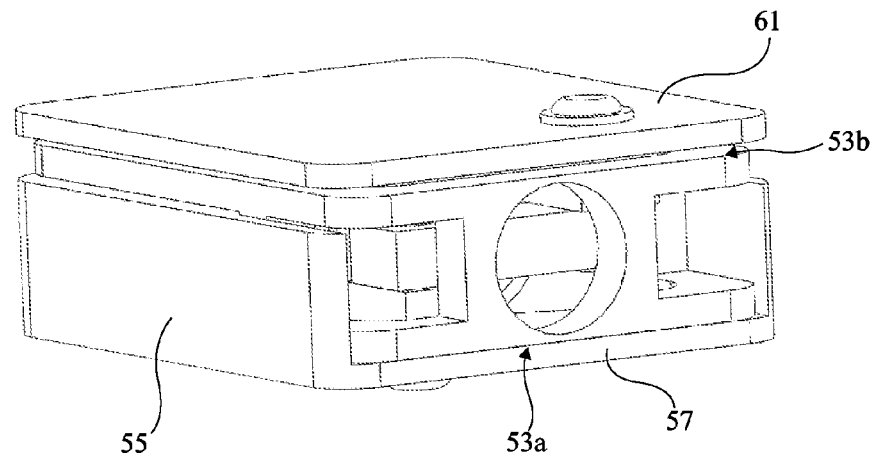

FIGS. 6A and 6B are perspective views showing an alternative embodiment of the power measurement system of FIGS. 5A and 5B. FIG. 6A is an exploded view (before assembly of the measurement system) of the system of FIG. 6B (measurement system assembled on the pedal).

The system of FIGS. 6A and 6B differs from the system of FIGS. 5A and 5B in that pressure sensor 59 is arranged in a free space of pedal 9, between surfaces 53*a* and 53*b*. In this example, surface 57 of package 55 faces surface 53*a* of the pedal, and transmission plate 61 is on the side of surface 53*b* of the pedal. Spacers 65*a* and 65*b* are respectively provided between surface 57 and sensor 59 and between sensor 59 and plate 61, to transmit the force exerted by the cyclist to sensor 59 (via plate 61).

It should be noted that free spaces are often provided in bicycle pedals. The provided system takes advantage of these spaces.

Figure 7A:
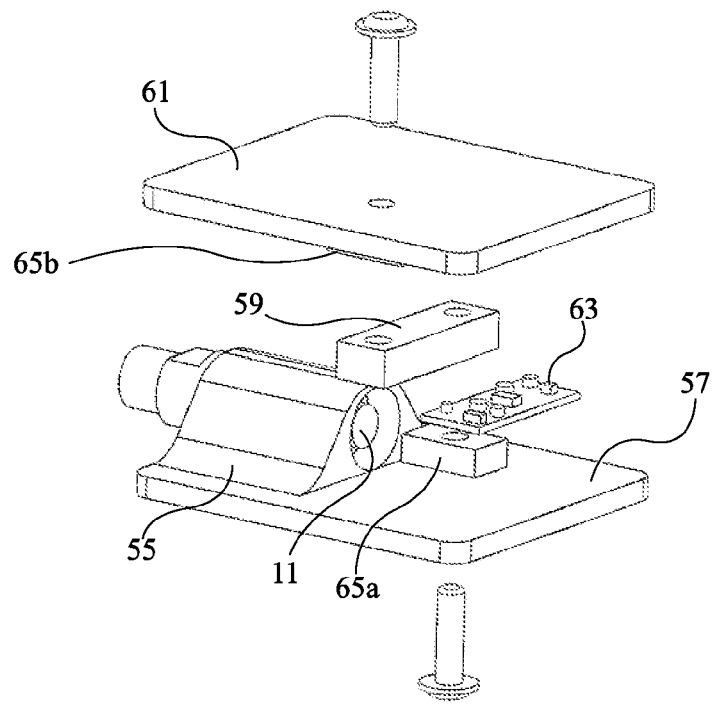
FIGS. 7A and 7B are perspective views showing another alternative embodiment of the measurement system of FIGS. 5A and 5B.
Figure 7B:
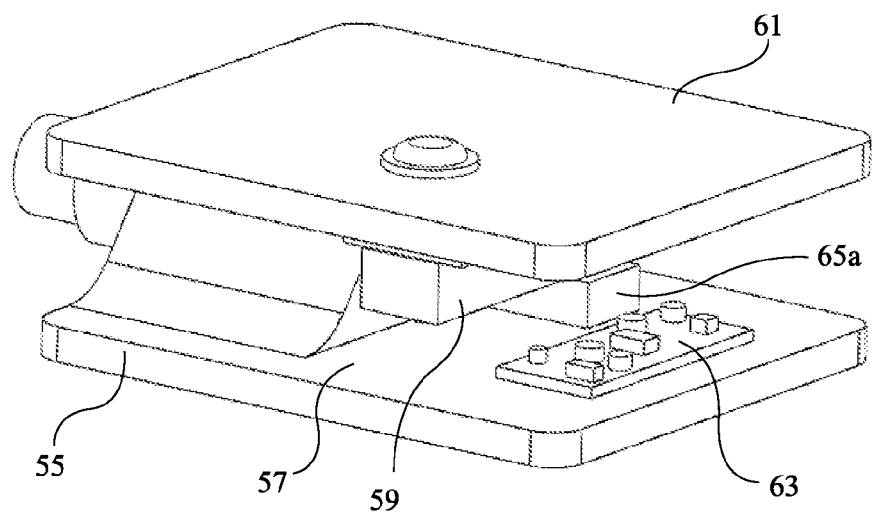

FIGS. 7A and 7B are perspective views showing another alternative embodiment of the power measurement system of FIGS. 5A and 5B. FIG. 7A is an exploded view (before assembly of the measurement system) of the system of FIG. 7B (measurement system assembled on the pedal).

In this variation, fastener 55 is not assembled on guide rails provided on lateral surfaces of the pedal, but on rotation axis 11 of the pedal. Element 55 comprises a planar portion 57 supporting, via a spacer 65*a*, pressure sensor 59. As in the example of FIGS. 6A and 6B, a spacer 65*b* forms an interface between sensor 59 and interface plate 61.

The described system replaces the pedal, which makes it easy to assemble on any bicycle to replace existing pedals.

Figure 8A:
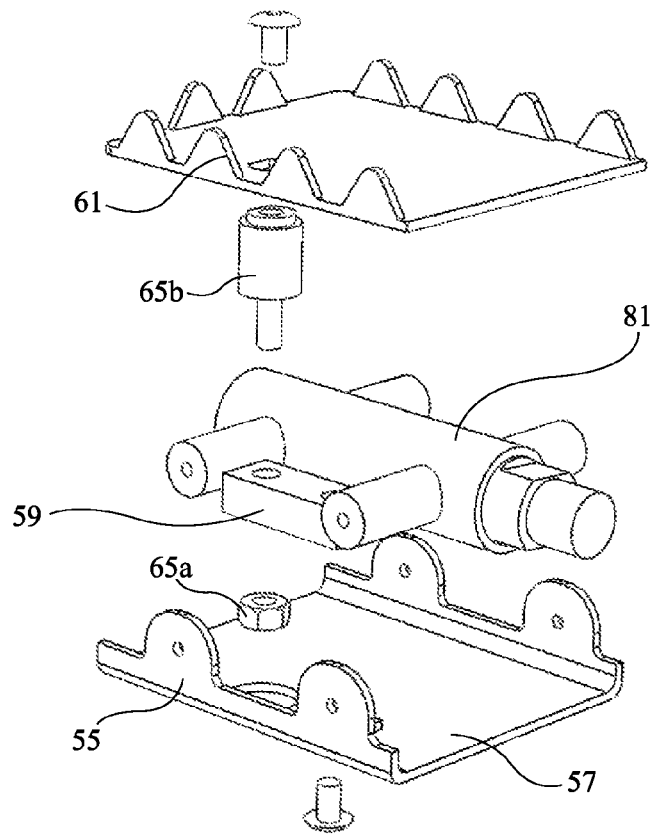
FIGS. 8A and 8B are perspective views showing another alternative embodiment of the measurement system of FIGS. 5A and 5B.
Figure 8B:
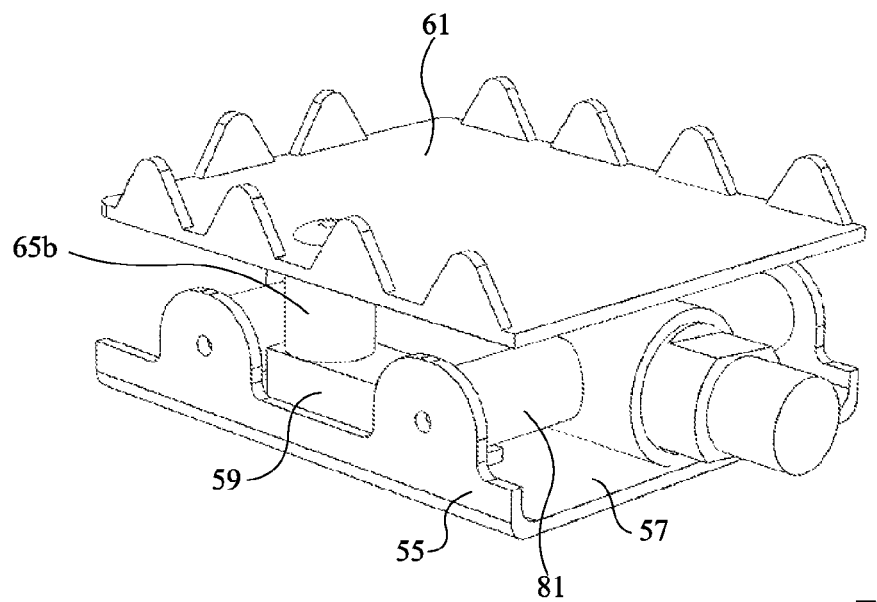

FIGS. 8A and 8B are perspective views showing another alternative embodiment of the power measurement system of FIGS. 5A and 5B, assembled around framework 81 of a pedal.

FIG. 8A is an exploded view (before assembly of the measurement system) of the system of FIG. 8B (measurement system assembled on the pedal). This embodiment takes advantage of the free spaces between the two plates of a pedal of this type. In this example, element 55 is attached to frame 81 of the pedal by means of screws (four screws, not shown in the drawing), and pressure sensor 59 is housed in a space left free by frame 81, between the two plates of the pedal.

Figure 9A:
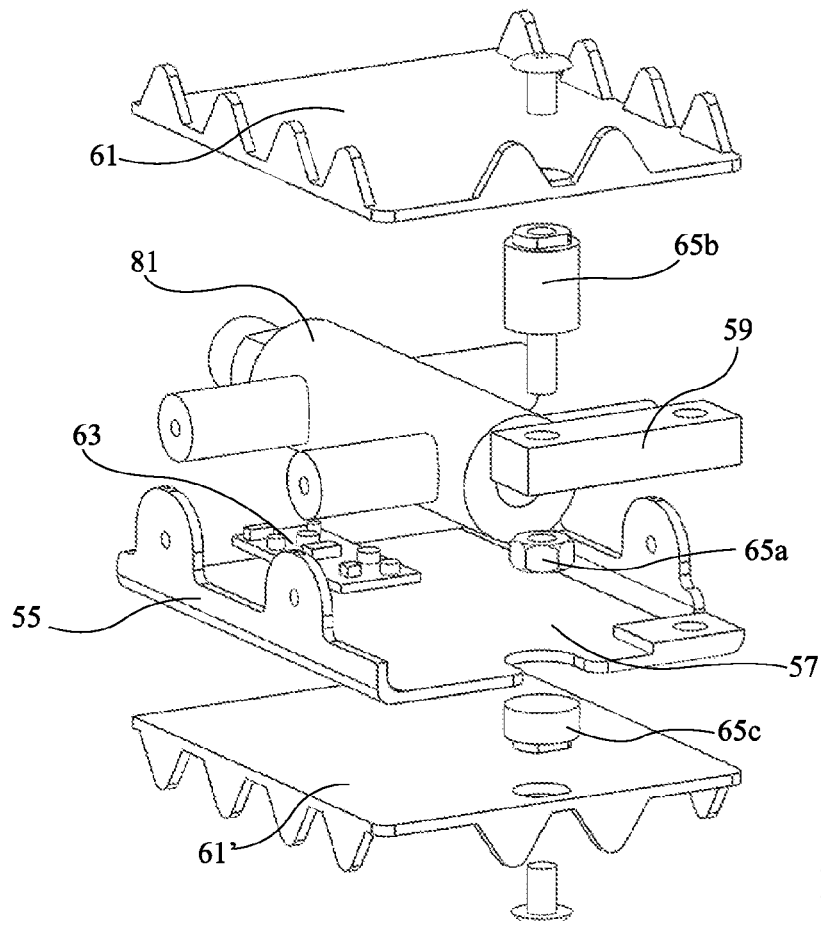
FIGS. 9A and 9B are perspective views showing another alternative embodiment of the measurement system of FIGS. 5A and 5B.
Figure 9B:
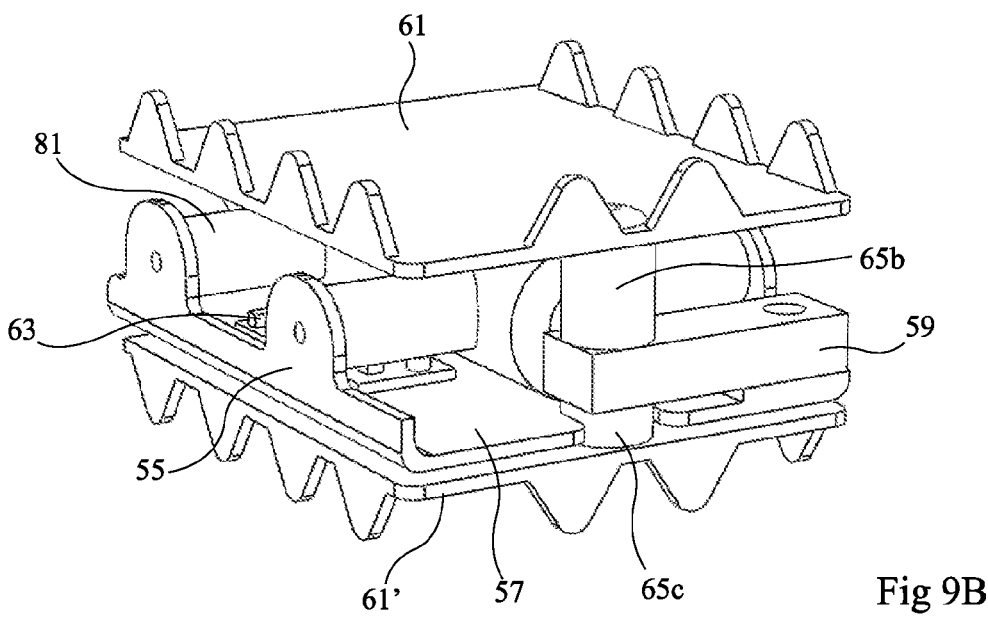

FIGS. 9A and 9B are perspective views showing another alternative embodiment of the power measurement system of FIGS. 5A and 5B. FIG. 9A is an exploded view (before assembly of the measurement system) of the system of FIG. 9B (measurement system assembled on the pedal). The system of FIGS. 9A and 9B is, like the system of FIGS. 8A and 8B, assembled around framework 81 of a pedal, and differs from this system in that it is capable of measuring the output power developed by the cyclist whatever the main surface of the pedal in contact with the cyclist's foot. For this purpose, a second interface plate 61', arranged on the side of the pedal opposite to interface plate 61, is capable of transmitting to sensor 59, via a spacer 65*c*, a force exerted by the cyclist.

Figure 10A:
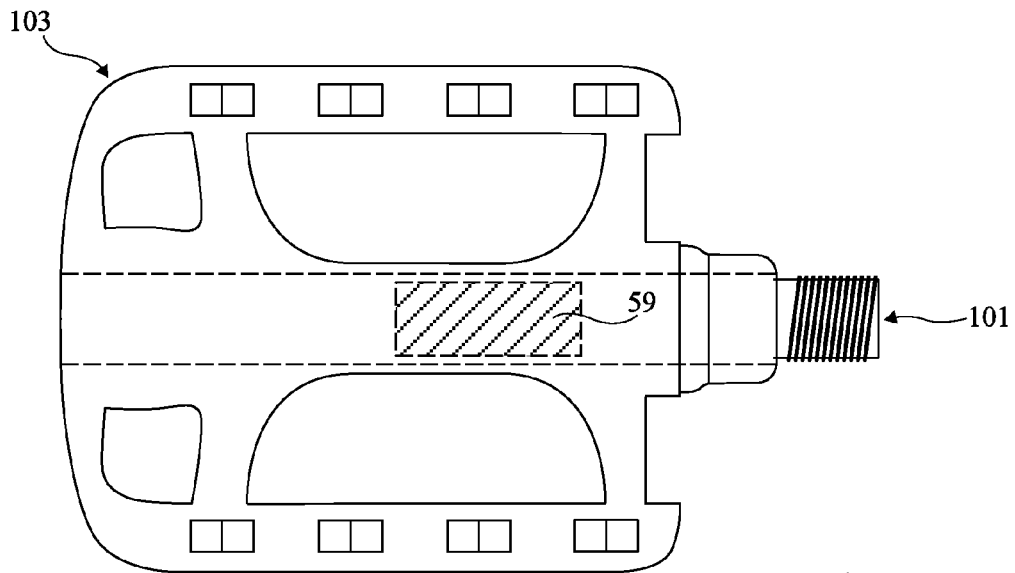
FIGS. 10A, 10B, and 10C show another embodiment of a power measurement system assembled on a bicycle pedal.
Figure 10B:
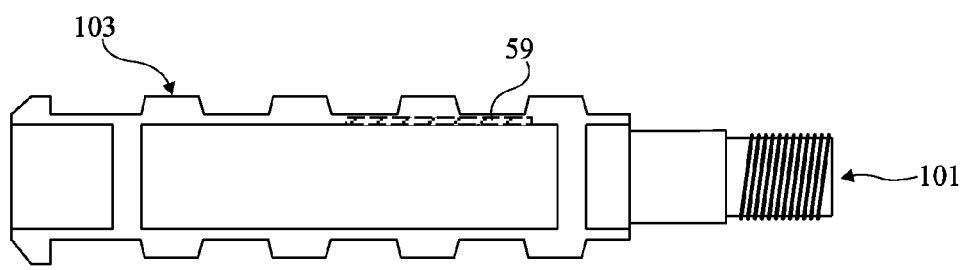
Figure 10C:
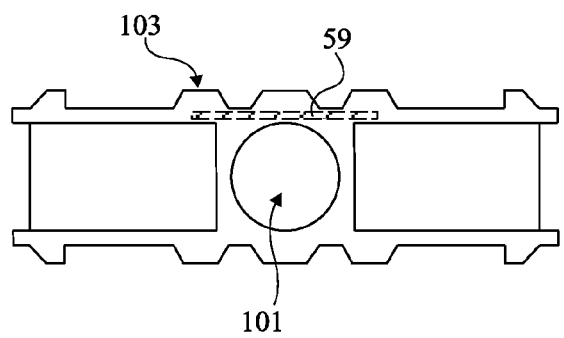

FIGS. 10A, 10B, and 10C show another embodiment of a system for measuring the developed output power assembled on a bicycle pedal. FIG. 10A is a top view of the pedal, and FIGS. 10B and 10C and front and side views. In this example the pedal comprises two portions: axis 101 of the pedal (rotation axis), for example, made of forged metal, intended to be connected to the crank (for example, screwed to the crank); and body 103, for example, made of plastic molded around this axis.

In this example, it is provided to position pressure sensor 59 of the power measurement system (for example, a piezoelectric sensor) within the portion of body 103 facing axis 101, preferably in the pedal portion located on the crank side (right-hand portion of the pedal in the view of FIG. 10A). This region of the pedal indeed is the region where the orthogonal pressures exerted by the cyclist's foot on the pedal are the strongest. The pressure sensor is for example embedded in the plastic of body 103.

Figure 11A:
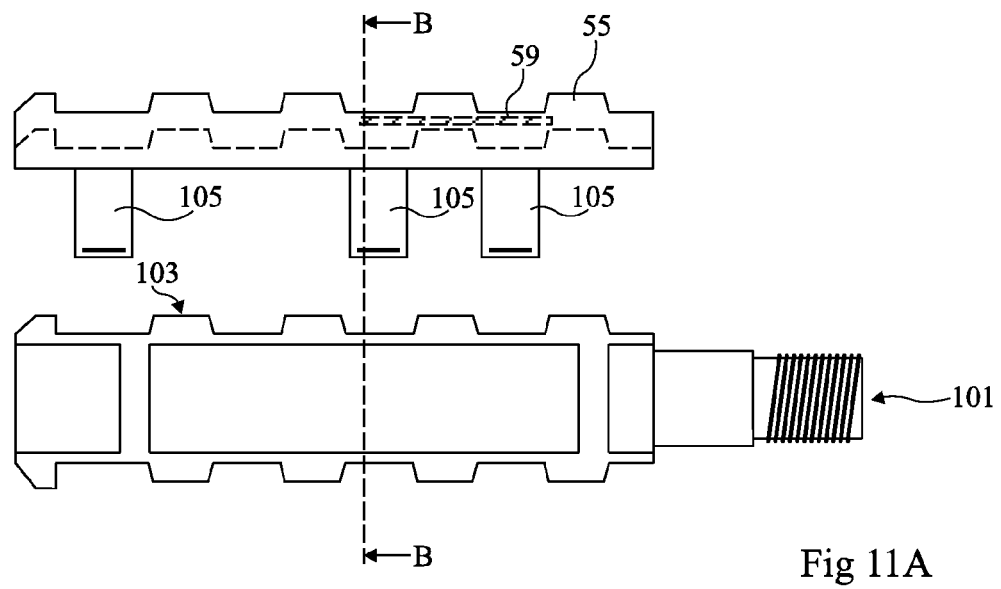
FIGS. 11A and 11B shows an alternative embodiment of the measurement system of FIGS. 10A to 10C.
Figure 11B:
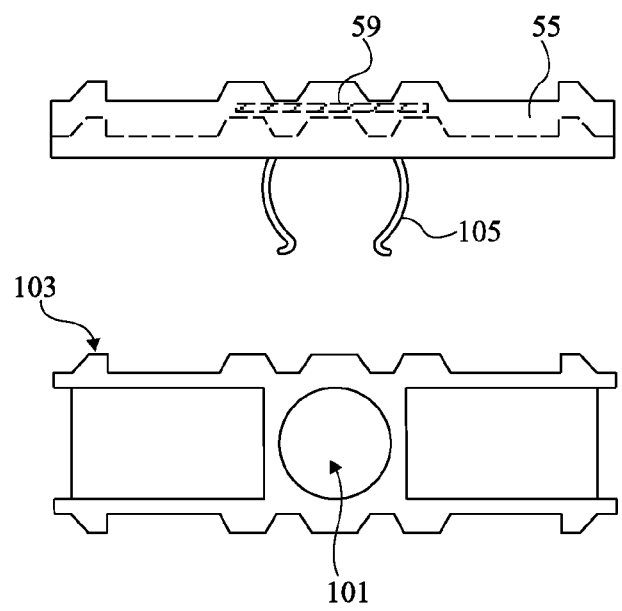

FIGS. 11A and 11B respectively are side and front views illustrating an alternative embodiment of the system described in relation with FIGS. 10A to 10C. FIG. 11B is a cross-section view along plane B-B of FIG. 11A. In this example, the power measurement system, and more specifically pressure sensor 59, position above body 103 of the pedal. The power measurement system is assembled on an element 55 of fastening to the pedal. Element 55 stacks on body 103, and can be snapped on axis 101 by means of a fastening system 105. Element 55 is for example made of molded plastic, and pressure sensor 59 may be embedded in the plastic of element 55. The molding of element 55 may correspond to the negative of the upper surface of body 103, to ascertain that no significant parasitic clearance is present between element 55 and body 103. As in the example of FIGS. 10A to 10C, pressure sensor 59 will be positioned in the pedal area where the pressure exerted by the cyclist is the strongest, that is, opposite to axis 101 of fastening to the crank, and preferably in the pedal half which is closest to the crank (right-hand portion in the view of FIG. 11A).

Specific embodiments of the present invention have been described. Various alterations and modifications will occur to those skilled in the art. In particular, in the examples described and shown hereabove, a single pedal has been mentioned. It should be noted that the provided system may be installed, as desired, on one pedal or on both pedals of a bicycle or of any other pedal vehicle.

The invention has been described in relation with an example of bicycle crankset, that is, a crank system where the crank driving member is a pedal. It will be within the abilities of those skilled in the art to adapt the provided power measurement system to any other type of crank device, for example, a winch, a crank thrust, etc.

More generally, it will be within the abilities of those skilled in the art to adapt the provided system to any type of device where a force is applied via an arm rotating around and axis, for example, a rower.

The invention claimed is:

1. A system for measuring an output power developed in a crankset, comprising:
    at least one pedal for actuating a crank of the crankset, the pedal having at least one guide rail provided on a lateral surface of the pedal;
    a single pressure sensor capable of measuring an orthogonal force exerted by a user on the pedal;
    at least one sensor for determining an angular position of the crank around a rotation axis of the crankset different from a rotation axis of the pedal with respect to the crank;
    a calculator for determining, by means of a pre-established model of distribution of a force exerted on the pedal according to said angular position, a tangential force exerted on the crank; and
    an element for fastening to the pedal, the element having the pressure sensor affixed thereto, and an interface plate capable of transmitting a force exerted by the user to the pressure sensor,
    wherein said element is assembled on the pedal via the guide rail provided on the pedal.

2. The system of claim 1, wherein said pressure sensor faces an axis of fastening of the pedal to the crank.

3. The system of claim 1, wherein said pressure sensor comprises a strain gauge or a piezoelectric element.

4. The system of claim 1, further comprising means for determining the angular velocity of the crank.

5. The system of claim 1, further comprising means for determining the acceleration of the crank.

6. The system of claim 1, wherein said at least one angular position sensor comprises an accelerometer, a gyroscope, or a magnetic angle sensor.

7. The system of claim 1, wherein said sensors are capable of communicating with the calculator via a wireless link.

8. A bicycle equipped with the system of claim 1.

9. The system of claim 1, wherein:
    the pedal has a substantially parallelepipedal external shape comprising two main parallel opposite surfaces and four lateral surfaces of smaller areas;
    the element covers one of the main surfaces, and two parallel lateral surfaces of the pedal;
    the interface plate covers the second main surface of the pedal; and
    the pressure sensor is disposed between the element and the interface plate.

10. The system of claim 9, wherein the pressure sensor is arranged in a free space of the pedal, between the two main surfaces of the pedal.

11. A system for controlling a pedal-assist motor in a pedal vehicle, comprising:
    the system of claim 1; and
    means for increasing the motor power when the power provided by the user decreases and for decreasing it when the power provided by the user increases.

12. A bicycle equipped with a pedal-assist motor and with the system for controlling this motor of claim 11.

13. A method for using the system of claim 1, comprising the steps of:
    a) measuring the force exerted by the user orthogonally to the pedal;
    b) determining the angular position of the crank around the rotation axis of the crankset; and
    c) by means of a pre-established model of distribution of the force exerted on the pedal according to said angular position, deducing the tangential force exerted on the crank.

14. The method of claim 13, further comprising, before step c), the steps of:
    b) determining the angular velocity of the crank around the axis of the crankset; and
    e) selecting said model from a list of pre-established models.

15. The method of claim 13, further comprising the step of:
    deducing from said tangential force the developed output power.

* * * * *